United States Patent
Anant et al.

(10) Patent No.: US 10,504,037 B1
(45) Date of Patent: Dec. 10, 2019

(54) SYSTEMS AND METHODS FOR AUTOMATED DOCUMENT REVIEW AND QUALITY CONTROL

(71) Applicant: Veritas Technologies LLC, Mountain View, CA (US)

(72) Inventors: Bashyam Anant, Saratoga, CA (US); Mat Beer, Sunnyvale, CA (US); Houshang Livian, Sunnyvale, CA (US); Indira Iyer, Cupertino, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 885 days.

(21) Appl. No.: 15/087,946

(22) Filed: Mar. 31, 2016

(51) Int. Cl.
*G06N 20/00* (2019.01)
*G06F 16/93* (2019.01)
*G06F 16/2457* (2019.01)

(52) U.S. Cl.
CPC ....... *G06N 20/00* (2019.01); *G06F 16/24578* (2019.01); *G06F 16/93* (2019.01)

(58) Field of Classification Search
CPC ........ G06F 16/93; G06N 20/10; G06N 20/00; G06K 9/00442
See application file for complete search history.

(56) References Cited

U.S. PATENT DOCUMENTS

| | | | |
|---|---|---|---|
| 8,965,814 B1 * | 2/2015 | Rangan | G06N 20/00 706/12 |
| 9,058,327 B1 | 6/2015 | Lehrman et al. | |
| 9,122,679 B1 | 9/2015 | Yu et al. | |
| 2009/0106239 A1 * | 4/2009 | Getner | G06F 16/35 |
| 2010/0077301 A1 * | 3/2010 | Bodnick | G06Q 30/02 715/274 |
| 2010/0312725 A1 * | 12/2010 | Privault | G06N 5/043 706/12 |

(Continued)

OTHER PUBLICATIONS

Grossman, Maura R., et al., "Technology-Assisted Review in E-Discovery Can Be More Effective and More Efficient Than Exhaustive Manual Review", http://www.sfldata.com/wp-content/uploads/2012/07/grossman-cormack-20110326.pdf, as accessed Feb. 22, 2016, Richmond Journal of Law and Technology, vol. XVII, Issue 3, (Spring 2011).

(Continued)

*Primary Examiner* — Scott A. Waldron
*Assistant Examiner* — Fen Christopher Tamulonis
(74) *Attorney, Agent, or Firm* — FisherBroyles, LLP (57) ABSTRACT

A computer-implemented method for automated document review and quality control may include (1) dividing a set of documents to be reviewed for relevancy into sets of control documents, training documents, quality-control documents, and review documents, (2) calculating, based on a set of reviews performed by a group of reviewers on the set of quality-control documents, an effective speed score for each reviewer in the group of reviewers, (3) assigning, based on the effective speed score, the set of control documents and the set of training documents to the group of reviewers, (4) training a predictive model using a set of training reviews performed by the group of reviewers on both the set of training documents and the set of control documents, and (5) using the predictive model to evaluate the set of review documents. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2011/0047156 A1* | 2/2011 | Knight | ............... | G06N 5/02 |
| | | | | 707/737 |
| 2012/0150851 A1* | 6/2012 | Agrawal | ............... | G06F 16/353 |
| | | | | 707/728 |
| 2012/0191708 A1* | 7/2012 | Barsony | ............... | G06Q 10/00 |
| | | | | 707/737 |
| 2012/0278266 A1* | 11/2012 | Naslund | ............... | G06N 20/00 |
| | | | | 706/45 |
| 2015/0254791 A1* | 9/2015 | Stockton | ............... | G06Q 50/18 |
| | | | | 705/7.28 |

OTHER PUBLICATIONS

"Catalyst", http://www.catalystsecure.com/, as accessed Feb. 22, 2016, Catalyst Repository Systems, (Dec. 6, 2006).
"kCura", https://www.kcura.com/, as accessed Feb. 22, 2016, (May 1, 2001).
System and Method for Training Data Generation in Predictive Coding; U.S. Appl. No. 13/843,501, filed Mar. 15, 2013.
"Equivio", http://www.equivio.com/, as accessed Feb. 22, 2016, Microsoft Corporation, (Nov. 10, 2004).

* cited by examiner

SYSTEMS AND METHODS FOR AUTOMATED DOCUMENT REVIEW AND QUALITY CONTROL

BACKGROUND

In electronic document review, such as when reviewing documents for legal cases, accuracy is vital to determining whether an electronic document is relevant to a particular case or topic. Traditionally, human reviewers review and code these electronic documents to decide their relevance. Unfortunately, analysis of documents by human reviewers may be inaccurate for many reasons. For example, a single reviewer may be inconsistent in reviewing multiple documents. In addition, manual coding takes valuable time and resources and may not be cost-effective for large volumes of electronic documents.

Furthermore, documents are often allocated to multiple reviewers for faster review. However, reviewers may not be consistent with each other, and each reviewer may have a different level of accuracy or speed. In some cases, machine learning methods may be used to train a predictive model to automatically review electronic documents for relevancy. While this may increase the overall consistency of reviews and decrease costs, the accuracy of a model trained by machine learning is dependent on the accuracy of the training data, which may be manually coded and flawed. Accordingly, the instant disclosure identifies and addresses a need for additional and improved systems and methods for automated document review and quality control.

SUMMARY

As will be described in greater detail below, the instant disclosure generally relates to systems and methods for automated document review and quality control by training a predictive model with peer-reviewed electronic documents. For example, the disclosed systems may first calculate the accuracy of reviewers by assigning the same documents to multiple reviewers and evaluating the agreement between reviewers. The disclosed systems may then allocate a set of training documents and a set of control documents to reviewers for manual review by dividing documents based on reviewers' accuracy. After training a predictive model using the training and control documents, these systems may then use the model to predict the relevance of the remaining electronic documents.

In one example, a computer-implemented method for automated document review and quality control may include (1) dividing a set of documents to be reviewed for relevancy into a set of control documents, a set of training documents, a set of quality-control documents, and a set of review documents, (2) calculating, based on a set of reviews performed by a group of reviewers on the set of quality-control documents, an effective speed score for each reviewer in the group of reviewers, (3) assigning, based on the effective speed score, the set of control documents and the set of training documents to the group of reviewers, (4) training a predictive model using a set of training reviews performed by the group of reviewers on both the set of training documents and the set of control documents, and (5) using the predictive model to evaluate the set of review documents.

In some embodiments, dividing the set of documents may include selecting representative samples of the set of documents for the set of control documents and the set of training documents. Furthermore, in some embodiments, the set of quality-control documents may include documents selected from both the set of control documents and the set of training documents for additional review.

In some examples, the set of reviews performed by the group of reviewers may include reviews received from at least three reviewers from the group of reviewers for each document in the set of quality-control documents. In these examples, the effective speed score may include an accuracy score based on an agreement between the three reviewers for each document reviewed by the reviewer and a speed score based on an average time taken by the reviewer to review the documents. Additionally, in some examples, assigning the set of control documents and the set of training documents to the group of reviewers may include dividing a quantity of documents among the group of reviewers in proportion to the effective speed score for each reviewer.

In one embodiment, training the predictive model may include using machine learning to train the predictive model with the set of training reviews. Additionally or alternatively, training the predictive model may include determining that the predictive model passes a benchmark for accuracy or determining that the predictive model fails the benchmark for accuracy. In response to determining that the predictive model fails the benchmark, the computer-implemented method may further include adding at least one document from the set of review documents to the set of training documents, adding a review of the document to the set of training reviews, and retraining the predictive model using the set of training reviews.

In one example, using the predictive model to evaluate the set of review documents may include using the predictive model to calculate a prediction rank for each document in the set of review documents. In this example, the prediction rank may include a likelihood score that the document is classified as relevant. Additionally, in some examples, the computer-implemented method may further include identifying a set of relevant documents based on a predetermined threshold for the prediction rank and assigning the set of relevant documents to the group of reviewers based on the effective speed score. In these examples, assigning the set of relevant documents to the group of reviewers may include assigning a document with a lower prediction rank to a reviewer with a higher effective speed score.

In one embodiment, a system for implementing the above-described method may include (1) a division module, stored in memory, that divides a set of documents to be reviewed for relevancy into a set of control documents, a set of training documents, a set of quality-control documents, and a set of review documents, (2) a calculation module, stored in memory, that calculates, based on a set of reviews performed by a group of reviewers on the set of quality-control documents, an effective speed score for each reviewer in the group of reviewers, (3) an assignment module, stored in memory, that assigns, based on the effective speed score, the set of control documents and the set of training documents to the group of reviewers, (4) a training module, stored in memory, that trains a predictive model using a set of training reviews performed by the group of reviewers on both the set of training documents and the set of control documents, and (5) an evaluation module, stored in memory, that uses the predictive model to evaluate the set of review documents. In addition, the system may include at least one processor that executes the division module, the calculation module, the assignment module, the training module, and the evaluation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) divide a set of documents to be reviewed for relevancy into a set of control documents, a set of training documents, a set of quality-control documents, and a set of review documents, (2) calculate, based on a set of reviews performed by a group of reviewers on the set of quality-control documents, an effective speed score for each reviewer in the group of reviewers, (3) assign, based on the effective speed score, the set of control documents and the set of training documents to the group of reviewers, (4) train a predictive model using a set of training reviews performed by the group of reviewers on both the set of training documents and the set of control documents, and (5) use the predictive model to evaluate the set of review documents.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automated document review and quality control. As will be explained in greater detail below, by improving the training documents used to train a predictive model, the systems and methods disclosed herein may improve the automated review of document relevance. For example, by calculating the accuracy and speed of reviewers using peer review, the disclosed systems and methods may assign more training documents to reviewers with higher accuracy and faster review speed. The disclosed systems and methods may then train the predictive model with more accurate training documents and subsequently improve further review of the remaining documents using the improved predictive model.

Figure 1:
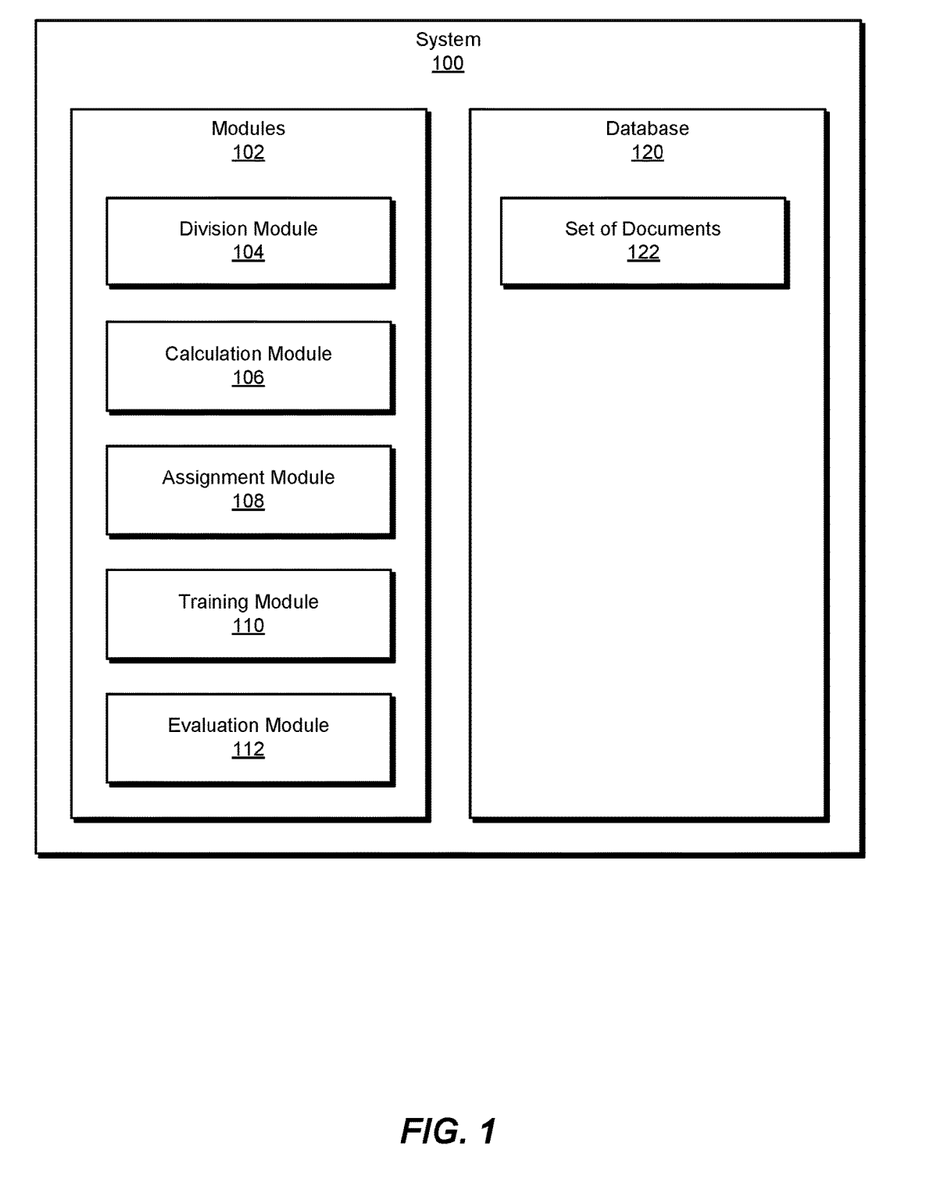
FIG. 1 is a block diagram of an exemplary system for automated document review and quality control.
Figure 2:
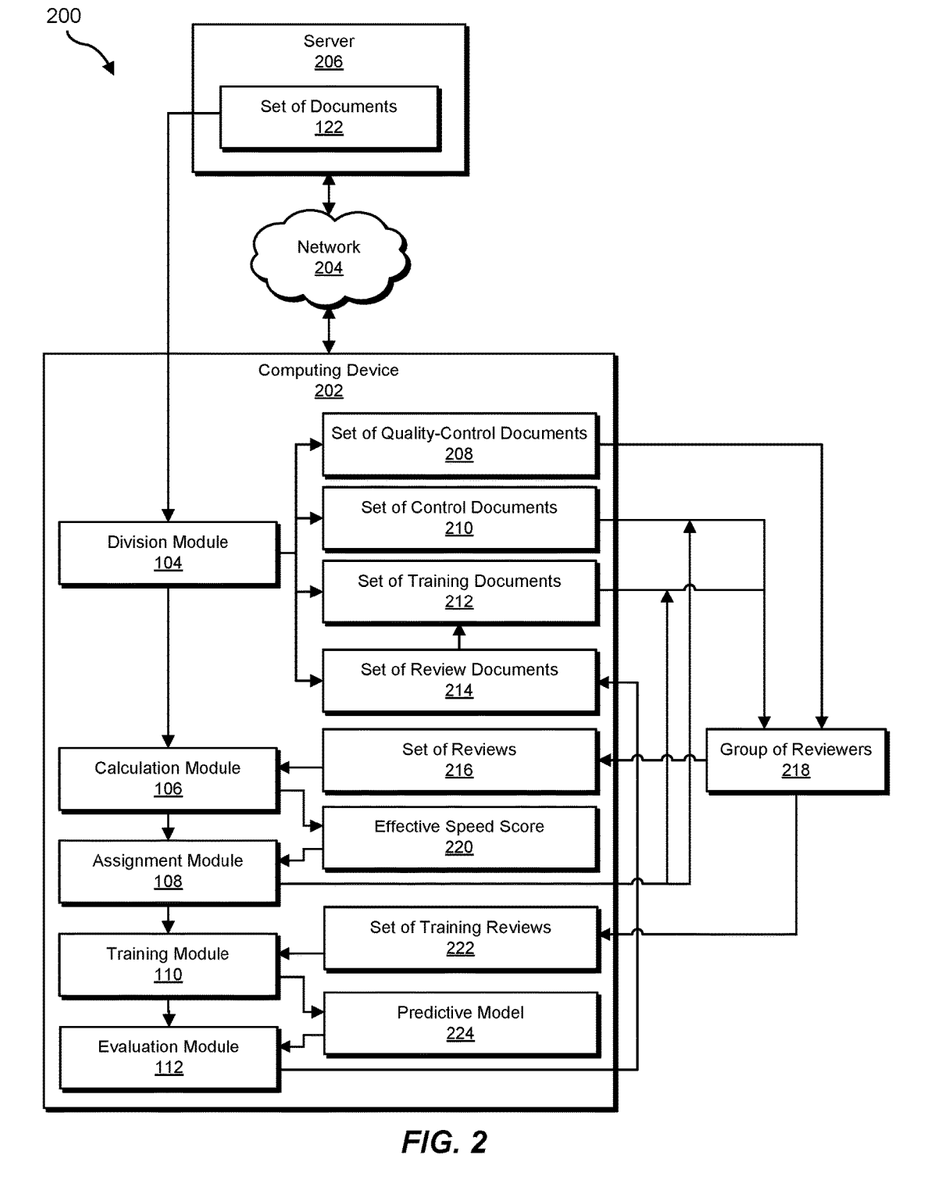
FIG. 2 is a block diagram of an additional exemplary system for automated document review and quality control.

The following will provide, with reference to FIGS. 1 and 2, detailed descriptions of exemplary systems for automated document review and quality control. Detailed descriptions of corresponding computer-implemented methods will also be provided in connection with FIG. 3. In addition, detailed descriptions of an exemplary calculation of exemplary effective speed scores for reviewers will be provided in connection with FIG. 4. Furthermore, detailed descriptions of an exemplary assignment of relevant documents to reviewers based on exemplary prediction ranks will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for automated document review and quality control. As illustrated in this figure, exemplary system 100 may include one or more modules 102 for performing one or more tasks. For example, and as will be explained in greater detail below, exemplary system 100 may include a division module 104 that may divide a set of documents to be reviewed for relevancy into a set of control documents, a set of training documents, a set of quality-control documents, and a set of review documents. The term "document," as used herein, generally refers to electronic content that may be used electronically or output to a physical form. Examples of electronic documents may include, without limitation, text files, spreadsheets, emails, or any other suitable files or documents.

Exemplary system 100 may additionally include a calculation module 106 that may calculate, based on a set of reviews performed by a group of reviewers on the set of quality-control documents, an effective speed score for each reviewer in the group of reviewers. As used herein, the term "effective speed" generally refers to a rate of effectively completing a task, particularly in accurately assessing documents. Exemplary system 100 may also include an assignment module 108 that may assign, based on the effective speed score, the set of control documents and the set of training documents to the group of reviewers. Exemplary system 100 may further include a training module 110 that may train a predictive model using a set of training reviews performed by the group of reviewers on both the set of training documents and the set of control documents. The term "predictive model," as used herein, generally refers to a model or algorithm that may predict outcomes based on input data. Examples of predictive models may include, without limitation, a classifier, a support vector machine, a decision tree, a statistical algorithm, or any other suitable method of predicting outcomes.

Finally, exemplary system 100 may include an evaluation module 112 that may use the predictive model to evaluate the set of review documents. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a set of documents 122, which may include electronic documents that need to be reviewed for relevancy.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to train a predictive model to evaluate the relevance of electronic documents. For example, and as will be described in greater detail below, division module 104 on computing device 202 may divide a set of documents 122 to be reviewed for relevancy (received, e.g., from server 206 via network 204) into a set of control documents 210, a set of training documents 212, a set of quality-control documents 208, and a set of review documents 214. Calculation module 106 on computing device 202 may then assign documents from set of quality-control documents 208 to reviewers in a group of reviewers 218 and subsequently receive a set of reviews 216 for set of quality-control documents 208. Next, assignment module 108 on computing device 202 may calculate an effective speed score 220 for each reviewer and use effective speed score 220 to divide and assign documents from set of control documents 210 and set of training documents 212 to group of reviewers 218. Training module 110 on computing device 202 may then receive a set of training reviews 222 for set of control documents 210 and set of training documents 212 and use set of training reviews 222 to train predictive model 224. Finally, evaluation module 112 on computing device 202 may use the trained predictive model 224 to evaluate and review set of review documents 214 for relevancy.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and/or managing set of documents 122. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
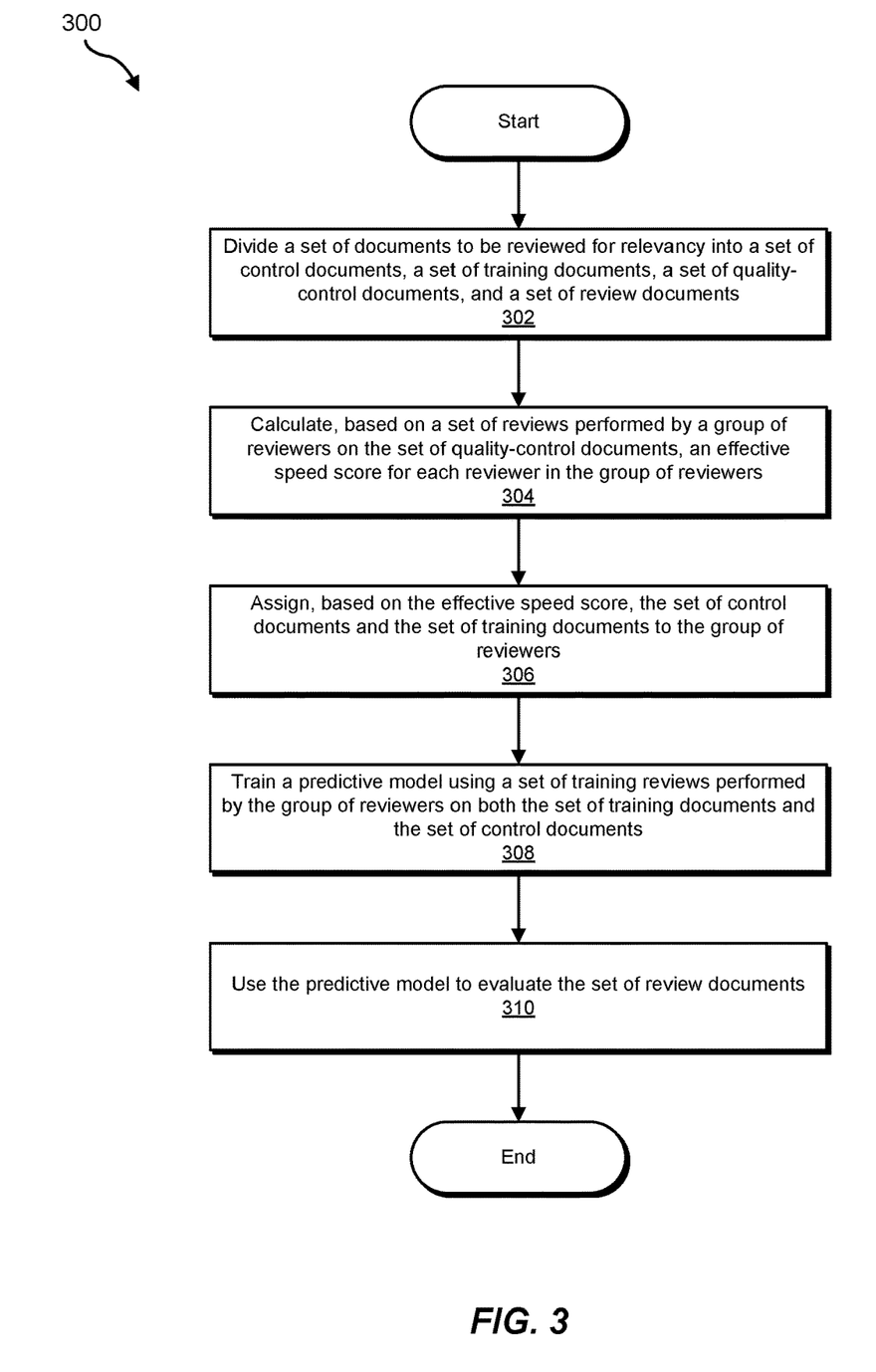
FIG. 3 is a flow diagram of an exemplary method for automated document review and quality control.

FIG. 3 is a flow diagram of an exemplary computer-implemented method 300 for automated document review and quality control. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may divide a set of documents to be reviewed for relevancy into a set of control documents, a set of training documents, a set of quality-control documents, and a set of review documents. For example, division module 104 may, as part of computing device 202 in FIG. 2, divide set of documents 122 to be reviewed for relevancy into set of control documents 210, set of training documents 212, set of quality-control documents 208, and set of review documents 214.

Division module 104 may divide set of documents 122 in a variety of ways. In one example, set of quality-control documents 208 may include documents used to evaluate reviewers in group of reviewers 218. In addition, set of control documents 210 and set of training documents 212 may include documents used to train predictive model 224. Finally, set of review documents 214 may include any remaining documents from set of documents 122 that are not selected for the other sets of documents.

In some examples, division module 104 may divide set of documents 122 by selecting representative samples of set of documents 122 for set of control documents 210 and set of training documents 212. In these examples, division module 104 may select representative documents based on a variety of attributes, such as document length, type of file, or any other suitable metric. In additional examples, set of quality-control documents 208 may include documents selected from both set of control documents 210 and set of training documents 212 for additional review. In these examples, set of quality-control documents 208 may be randomly selected. Alternatively, set of quality-control documents 208 may be selected based on representative attributes or difficulty of review to provide better quality control.

Returning to FIG. 3, at step 304, one or more of the systems described herein may calculate, based on a set of reviews performed by a group of reviewers on the set of quality-control documents, an effective speed score for each reviewer in the group of reviewers. For example, calculation module 106 may, as part of computing device 202 in FIG. 2, calculate, based on set of reviews 216 performed by group of reviewers 218 on set of quality-control documents 208, effective speed score 220 for each reviewer in group of reviewers 218.

Calculation module 106 may calculate effective speed score 220 in a variety of ways. In one embodiment, set of reviews 216 performed by group of reviewers 218 may include reviews received from at least three reviewers from group of reviewers 218 for each document in set of quality-control documents 208. In further embodiments, effective speed score 220 may include an accuracy score based on an agreement between the three reviewers for each document reviewed by the reviewer and a speed score based on an average time taken by the reviewer to review the documents.

Figure 4:
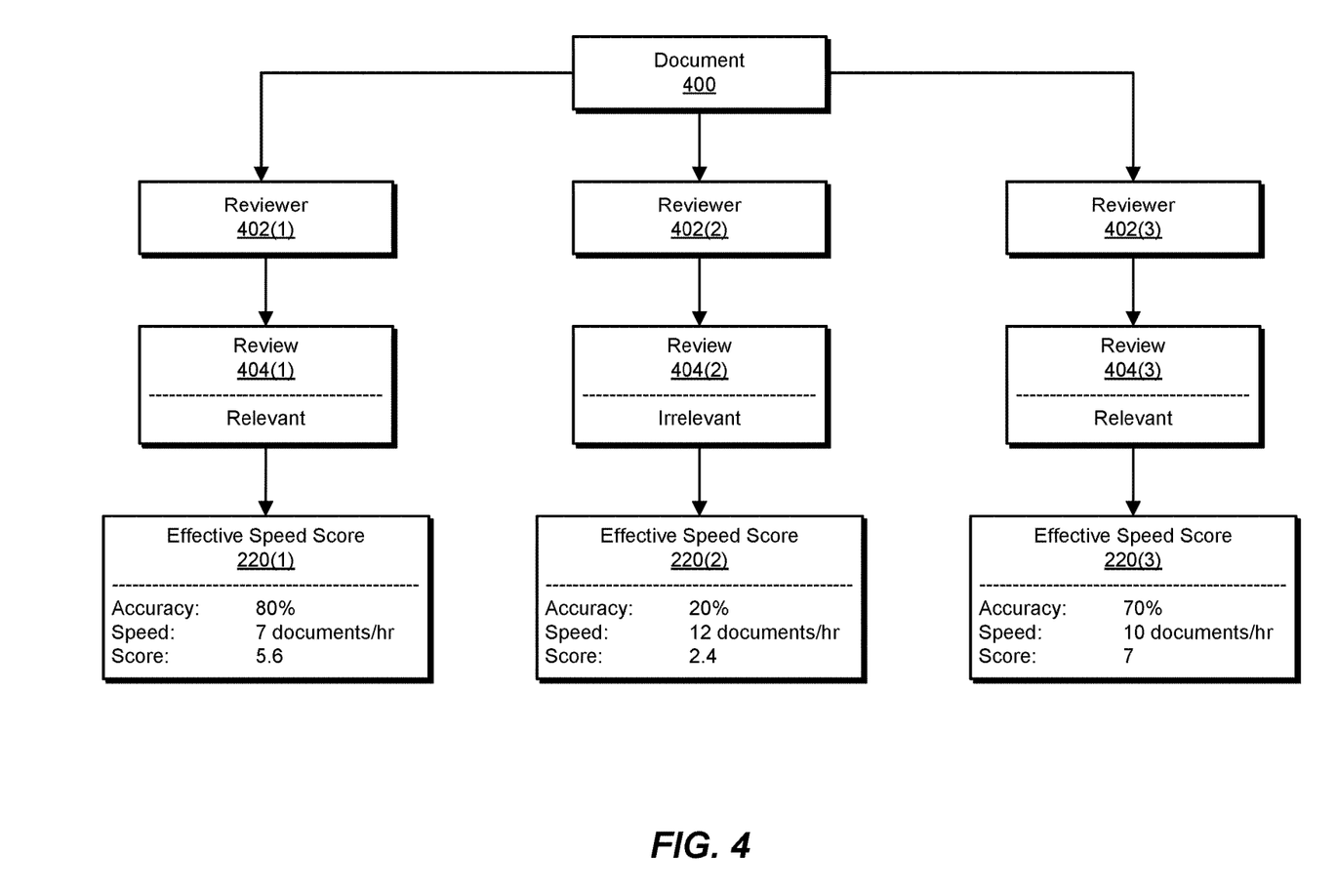
FIG. 4 is a block diagram of an exemplary calculation of exemplary effective speed scores for reviewers.

For example, as shown in FIG. 4, a document 400 in set of quality-control documents 208 may be assigned to a reviewer 402(1), a reviewer 402(2), and a reviewer 402(3). Reviewers 402(1), 402(2), and 402(3) may then submit a review 404(1), a review 404(2), and a review 404(3), respectively. Reviews 404(1), 404(2), and 404(3) may include a final judgment of relevancy (e.g., "relevant" or "irrelevant") for document 400. Calculation module 106 may subsequently calculate effective speed scores 220(1), 220(2), and 220(3) that include the agreement of all reviews by each reviewer as a degree of accuracy (e.g., 80%, 20%, and 70%) and a speed of each reviewer (e.g., 7, 12, and 10 documents per hour). In the example of FIG. 4, calculation module 106 may multiply the speed of each reviewer with the reviewer's overall accuracy to determine a final score (e.g., 5.6, 2.4, and 7).

Effective speed scores 220(1), 220(2), and 220(3) may represent each reviewer's ability to accurately complete a review in a timely manner. In the example of FIG. 4, calculation module 106 may determine accuracy for each document by calculating a percent of other peer reviewers who agree with each reviewer. Calculation module 106 may then calculate a total accuracy percentage using an average accuracy rating. Furthermore, in the example of FIG. 4, calculation module 106 may determine speed based on an average review completion rate, such as documents reviewed per hour.

In alternate examples, calculation module 106 may use different methods to calculate accuracy and/or speed per reviewer in order to obtain effective speed score 220. For example, calculation module 106 may assign additional reviewers to review document 400 after a first review is complete in order to confirm the accuracy of the first review. Calculation module 106 may then adjust accuracy for a reviewer after each additional review is complete. Accuracy may additionally include a balance of precision and completeness in identifying relevant documents. Furthermore, accuracy may include a weighted score based on a reviewer's rank or level of trust, so that a reviewer with higher rank is considered more accurate. Speed may also include a weighted score based on the type or complexity of certain documents. Calculation module 106 may further calculate effective speed score 220 using different functions relating accuracy and speed.

Returning to FIG. 3, at step 306, one or more of the systems described herein may assign, based on the effective speed score, the set of control documents and the set of training documents to the group of reviewers. For example, assignment module 108 may, as part of computing device 202 in FIG. 2, assign, based on effective speed score 220, set of control documents 210 and set of training documents 212 to group of reviewers 218.

Assignment module 108 may assign set of control documents 210 and set of training documents 212 in a variety of ways. In some examples, assignment module 108 may assign set of control documents 210 and set of training documents 212 to group of reviewers 218 by dividing a quantity of documents among group of reviewers 218 in proportion to effective speed score 220 for each reviewer. For example, reviewer 402(3) in FIG. 4 may be assigned a greater quantity of documents due to higher effective speed score 220(3) than reviewer 402(1) and reviewer 402(2). Assignment module 108 may additionally use an optimization program or algorithm based on effective speed score 220 to assign documents.

Alternatively, assignment module 108 may divide documents among group of reviewers 218 using different methods that allow for maximizing accuracy of reviews for set of control documents 210 and set of training documents 212. For example, assignment module 108 may first assign documents from set of control documents 210 to reviewers with high effective speed scores in order to ensure a more accurate control group to test the training of predictive model 224. Assignment module 108 may then divide less crucial documents among reviewers with lower effective speed scores.

Returning to FIG. 3, at step 308, one or more of the systems described herein may train a predictive model using a set of training reviews performed by the group of reviewers on both the set of training documents and the set of control documents. For example, training module 110 may, as part of computing device 202 in FIG. 2, train predictive model 224 using set of training reviews 222 performed by group of reviewers 218 on both set of training documents 212 and set of control documents 210.

Training module 110 may train predictive model 224 in a variety of ways. In one embodiment, training module 110 may train predictive model 224 by using machine learning to train predictive model 224 with set of training reviews 222. The term "machine learning," as used herein, generally refers to algorithms that may learn from data patterns in order to make predictions. Example of machine learning methods may include, without limitation, neural networks, clustering, regression analysis, classification, or any other suitable supervised, semi-supervised, or unsupervised methods.

Additionally, in some embodiments, training module 110 may determine that predictive model 224 passes a benchmark for accuracy. Alternatively, training module 110 may determine that predictive model 224 fails the benchmark for accuracy. The benchmark for accuracy may include a predetermined accuracy score or a score based on requirements for reviewing set of documents 122. For example, training module 110 may first calculate a benchmark based on reviews for set of control documents 210. Training module 110 may then train predictive model 224 with reviews for set of training documents 212 from among set of training reviews 222 and subsequently test reviews generated by predictive model 224 on set of control documents 210 against the benchmark.

In the above embodiments, one or more of the systems described herein may further include, in response to determining that predictive model 224 fails the benchmark, adding at least one document from set of review documents 214 to set of training documents 212, adding a review of the document to set of training reviews 222, and retraining predictive model 224 using updated set of training reviews 222. Training module 110 may continue to add documents to set of training documents 212 and retraining predictive model 224 until predictive model 224 passes the benchmark for accuracy.

Returning to FIG. 3, at step 310, one or more of the systems described herein may use the predictive model to evaluate the set of review documents. For example, evaluation module 112 may, as part of computing device 202 in FIG. 2, use predictive model 224 to evaluate set of review documents 214.

Evaluation module 112 may evaluate set of review documents 214 in a variety of ways. In one example, evaluation module 112 may use predictive model 224 to evaluate set of review documents 214 by using predictive model 224 to calculate a prediction rank for each document in set of review documents 214. In this example, the prediction rank may include a likelihood score that the document is classified as relevant. Furthermore, in some examples, one or more of the systems described herein may include identifying a set of relevant documents based on a predetermined threshold for the prediction rank and assigning the set of relevant documents to group of reviewers 218 based on effective speed score 220. In these examples, assigning the set of relevant documents to group of reviewers 218 may include assigning a document with a lower prediction rank to a reviewer with higher effective speed score 220.

Figure 5:
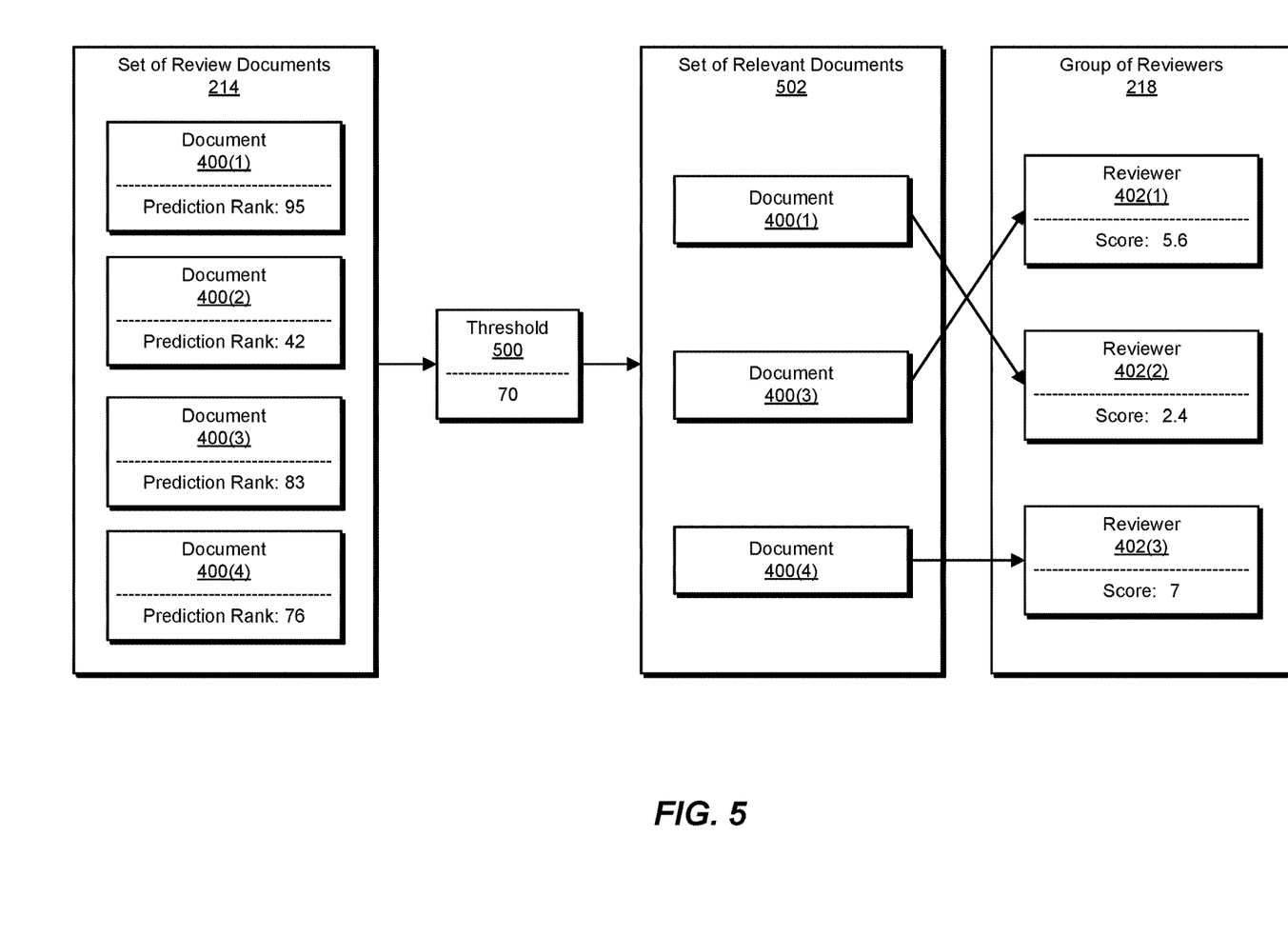
FIG. 5 is a block diagram of an exemplary assignment of relevant documents to reviewers based on exemplary prediction ranks.

As shown in FIG. 5, evaluation module 112 may use predictive model 224 to calculate prediction ranks for documents 400(1), 400(2), 400(3), and 400(4) in set of review documents 214. Evaluation module 112 may then identify a set of relevant documents 502 by determining documents 400(1), 400(3), and 400(4) have prediction ranks above a threshold 500. Threshold 500 may include a minimum likelihood for a document to be considered relevant. Evaluation module 112 may then assign set of relevant documents 502 to group of reviewers 218 using effective speed scores for each reviewer. Assigning set of relevant documents 502 to group of reviewers 218 may further confirm and improve relevancy predictions by predictive model 224 for set of review documents 214. Assigning documents with lower prediction ranks to reviewers with higher effective speed scores may further improve predictions by having more accurate reviewers review documents that are unclear in relevance for a final determination.

Additionally, predictive model 224 may review set of documents 122 along with group of reviewers 218. In this example, predictive model 224 may further contribute to a quality-control process of using multiple reviewers by acting as an artificial peer reviewer. The systems described herein may calculate agreement of relevance by comparing evaluations from predictive model 224 and reviews from group of reviewers 218. These systems may further determine a final relevancy based on the combined results from predictive model 224 and group of reviewers 218. Alternatively, reviews from group of reviewers 218 or evaluations from predictive model 224 may independently contribute to the final determination of relevancy.

As explained above in connection with method 300 in FIG. 3, the disclosed systems and methods may, by using peer review of documents, improve training data used to train a predictive model for evaluating document relevance for a topic. Specifically, the disclosed systems and methods may first select training and control groups of documents from a total set of documents that need to be reviewed. The disclosed systems and methods may then use some of the training and control documents as quality control by assigning multiple reviewers to manually review each one. For example, after a reviewer has reviewed a document, two or more other reviewers may review the same document to determine whether the first reviewer's judgment is accurate. The disclosed systems and methods may further calculate a score for each reviewer based on accuracy and speed of review.

The disclosed systems and methods may then assign training and control documents to reviewers based on each reviewer's score. For example, reviewers with higher accuracy and greater speed of review may review more control documents to create a high standard to compare the predictive model. Additionally, the systems and methods described herein may train the predictive model using the manually reviewed training documents. The predictive model may then evaluate the total set of documents for relevancy. Furthermore, the disclosed systems and methods may provide additional quality control by assigning reviewers to review documents that the predictive model considers relevant to the topic.

As detailed above, by improving training data used in machine learning, the disclosed systems and methods may create a more accurate predictive model for document review. In addition, by calculating individual scores of accuracy and speed, the disclosed systems and methods may automatically assign documents to reviewers based on reviewer effectiveness. Thus, the systems and methods described herein may increase the accuracy and speed of automated document review.

Figure 6:
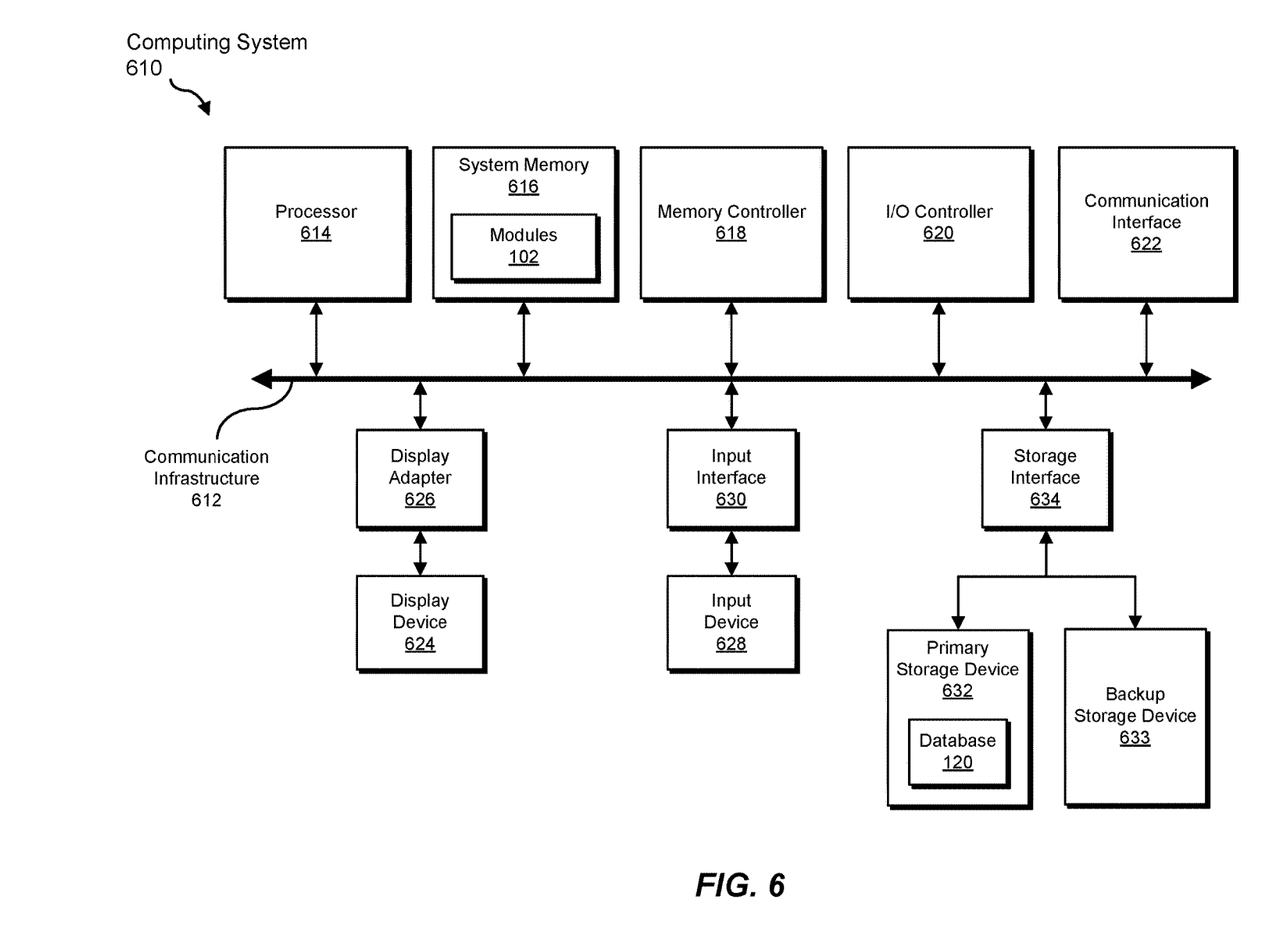
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
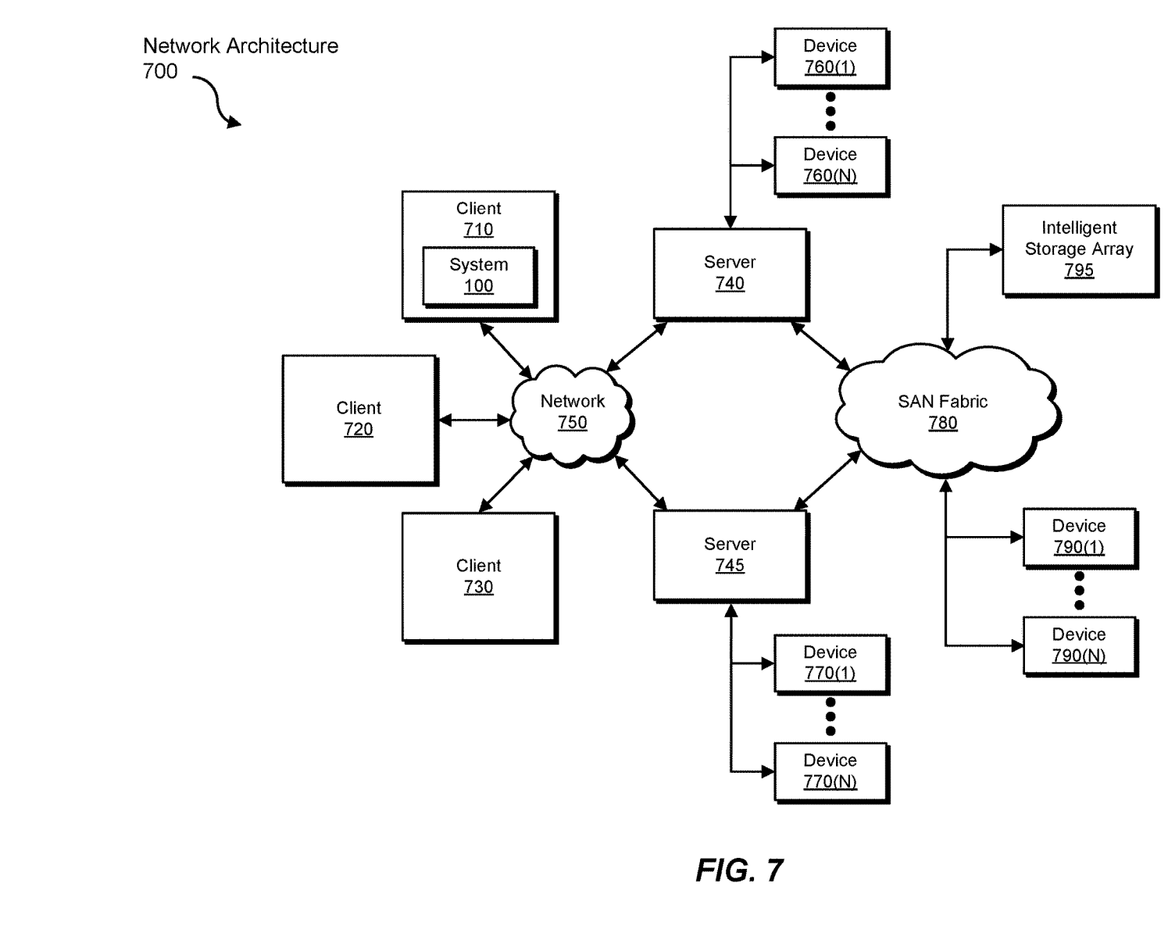
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for automated document review and quality control.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a set of documents to be transformed, transform the set of documents, output a result of the transformation to a storage or output device, use the result of the transformation to evaluate relevance of the set of documents to a specific case, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automated document review and quality control, at least a portion of the method being performed by a computing device comprising at least one processor, the method comprising:
    dividing a set of documents to be reviewed for relevancy into:
        a set of control documents;
        a set of training documents;
        a set of quality-control documents; and
        a set of review documents;
    calculating, based on a set of reviews performed by a group of reviewers on the set of quality-control documents, an effective speed score for each reviewer in the group of reviewers, wherein the effective speed score indicates a reviewer's ability to accurately complete a review in a given time, wherein accuracy is determined by agreement between the reviewer and other reviewers;
    assigning, based on the effective speed score, the set of control documents and the set of training documents to the group of reviewers;
    training a predictive model using a set of training reviews performed by the group of reviewers on both the set of training documents and the set of control documents; and
    using the predictive model to evaluate the set of review documents.

2. The method of claim 1, wherein dividing the set of documents comprises selecting representative samples of the set of documents for the set of control documents and the set of training documents.

3. The method of claim 1, wherein the set of quality-control documents comprises documents selected from both the set of control documents and the set of training documents for additional review.

4. The method of claim 1, wherein the set of reviews performed by the group of reviewers comprises reviews received from at least three reviewers from the group of reviewers for each document in the set of quality-control documents.

5. The method of claim 4, wherein the effective speed score comprises:
    an accuracy score based on an agreement between the three reviewers for each document reviewed by the reviewer; and
    a speed score based on an average time taken by the reviewer to review the documents.

6. The method of claim 1, wherein assigning the set of control documents and the set of training documents to the group of reviewers comprises dividing a quantity of documents among the group of reviewers in proportion to the effective speed score for each reviewer.

7. The method of claim 1, wherein training the predictive model comprises at least one of:
    using machine learning to train the predictive model with the set of training reviews;
    determining that the predictive model passes a benchmark for accuracy; and
    determining that the predictive model fails the benchmark for accuracy.

8. The method of claim 7, further comprising, in response to determining that the predictive model fails the benchmark:
    adding at least one document from the set of review documents to the set of training documents;
    adding a review of the document to the set of training reviews; and
    retraining the predictive model using the set of training reviews.

9. The method of claim 1, wherein using the predictive model to evaluate the set of review documents comprises using the predictive model to calculate a prediction rank for each document in the set of review documents.

10. The method of claim 9, wherein the prediction rank comprises a likelihood score that the document is classified as relevant.

11. The method of claim 9, further comprising:
    identifying a set of relevant documents based on a predetermined threshold for the prediction rank; and
    assigning the set of relevant documents to the group of reviewers based on the effective speed score.

12. The method of claim 11, wherein assigning the set of relevant documents to the group of reviewers comprises assigning a document with a lower prediction rank to a reviewer with a higher effective speed score.

13. A system for automated document review and quality control, the system comprising:
    a division module, stored in memory, that divides a set of documents to be reviewed for relevancy into:
        a set of control documents;
        a set of training documents;
        a set of quality-control documents; and
        a set of review documents;
    a calculation module, stored in memory, that calculates; based on a set of reviews performed by a group of reviewers on the set of quality-control documents, an effective speed score for each reviewer in the group of reviewers, wherein the effective speed score indicates a reviewer's ability to accurately complete a review in a given time, wherein accuracy is determined by agreement between the reviewer and other reviewers;
    an assignment module, stored in memory, that assigns, based on the effective speed score, the set of control documents and the set of training documents to the group of reviewers;
    a training module, stored in memory, that trains a predictive model using a set of training reviews performed by the group of reviewers on both the set of training documents and the set of control documents;

an evaluation module; stored in memory, that uses the predictive model to evaluate the set of review documents; and at least one processor that executes the division module, the calculation module, the assignment module, the training module, and the evaluation module.

14. The system of claim 13, wherein the division module divides the set of documents by selecting representative samples of the set of documents for the set of control documents and the set of training documents.

15. The system of claim 13, wherein the set of quality-control documents comprises documents selected from both the set of control documents and the set of training documents for additional review.

16. The system of claim 13, wherein the set of reviews performed by the group of reviewers comprises reviews received from at least three reviewers from the group of reviewers for each document in the set of quality-control documents.

17. The system of claim 16, wherein the effective speed score comprises:

an accuracy score based on an agreement between the three reviewers for each document reviewed by the reviewer; and a speed score based on an average time taken by the reviewer to review the documents.

18. The system of claim 13, wherein the assignment module assigns the set of control documents and the set of training documents to the group of reviewers by dividing a quantity of documents among the group of reviewers in proportion to the effective speed score for each reviewer.

19. The system of claim 13, wherein the training module trains the predictive model by at least one of:

using machine learning to train the predictive model with the set of training reviews;

determining that the predictive model passes a benchmark for accuracy; and determining that the predictive model fails the benchmark for accuracy.

20. A non-transitory computer-readable medium comprising one or more computer-executable instructions that, when executed by at least one processor of a computing device, cause the computing device to:

divide a set of documents to be reviewed for relevancy into:
a set of control documents;
a set of training documents;
a set of quality-control documents; and
a set of review documents;

calculate, based on a set of reviews performed by a group of reviewers on the set of quality-control documents, an effective speed score for each reviewer in the group of reviewers, wherein the effective speed score indicates a reviewer's ability to accurately complete a review in a given time, wherein accuracy is determined by agreement between the reviewer and other reviewers;

assign, based on the effective speed score, the set of control documents and the set of training documents to the group of reviewers;

train a predictive model using a set of training reviews performed by the group of reviewers on both the set of training documents and the set of control documents; and use the predictive model to evaluate the set of review documents.

* * * * *

UNITED STATES PATENT AND TRADEMARK OFFICE
CERTIFICATE OF CORRECTION

PATENT NO. : 10,504,037 B1
APPLICATION NO. : 15/087946
DATED : December 10, 2019
INVENTOR(S) : Anant et al.

Page 1 of 1

It is certified that error appears in the above-identified patent and that said Letters Patent is hereby corrected as shown below:

In the Claims

In Column 18, Line 52, Claim 13, delete "calculates;" and insert -- calculates, --, therefor.

In Column 19, Line 1, Claim 13, delete "module;" and insert -- module, --, therefor.

Signed and Sealed this
Twenty-first Day of January, 2020

Andrei Iancu
*Director of the United States Patent and Trademark Office*